Patented Dec. 15, 1942

2,305,573

UNITED STATES PATENT OFFICE 2,305,573

PREPARATION OF NITROPHENYL AMINES

Kenneth H. Klipstein, New Vernon, and Alfred G. Hill, North Branch, N. J., assignors to American Cyanamid Company, New York, N. Y., a corporation of Maine No Drawing. Application July 7, 1941, Serial No. 401,372

8 Claims. (Cl. 260—577)

This invention relates to a process for the preparation of nitrated phenyl amines from the corresponding nitrated phenyl halides. More particularly the invention is concerned with the preparation of dinitromethylaniline from dinitrochlorobenzene. The invention is not, however, limited to the preparation of dinitromethylaniline but includes other nitro anilines such as mononitroaniline, dinitroaniline, and dinitrodiphenylamine.

It is known that dinitrochlorobenzene will react with ammonia or with primary or secondary alkyl, aryl or mixed alkyl-aryl amines to form compounds having the general formula:

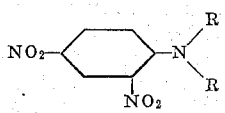

wherein R may be hydrogen, an alkyl or an aryl group. In carrying out this reaction the use of solutions of the reactants has been proposed. For example, in carrying out the reaction it has been suggested that the dinitrochlorobenzene be dissolved in an inert solvent such as benzene, toluene, monochlorobenzene and the like inert water-immiscible organic solvents. Typical of the process of the prior art is the process for the preparation of dinitromethylaniline from dinitrochlorobenzene described by Desseigne in "Memorial des Poudres" (Paris) 28, 156–170 (1938). According to this process an aqueous solution of methyl amine is reacted with a benzene solution of dinitrochlorobenzene. After the reaction is completed the benzene is steam distilled from the reaction mixture and the crystals of dinitromethylaniline recovered from the aqueous slurry by filtration. This process produces a dinitromethylaniline of high purity where, and only where, the original dinitrochlorobenzene was also of high purity.

It is the object of this invention to produce high purity dinitrophenylamines from ordinary commercial dinitrochlorobenzene. It is a further object of this invention to produce 2,4-dinitromethylaniline of sufficient purity, so that it will be satisfactory for conversion by nitration into trinitrophenylmethylnitramine (tetryl), from ordinary commercial 2,4-dinitrochlorobenzene such as is used for the manufacture of sulfur black and which has a freezing point in the range of from 47.5° to 48.1° C. According to the processes of the prior art, in order to produce a satisfactory grade of 2,4-dinitromethylaniline it has been found necessary to use a 2,4-dinitrochlorobenzene of high purity. According to the process of Desseigne, as a typical example, in order to produce a dinitromethylaniline satisfactory for conversion into tetryl, it has been necessary to start with a 2,4-dinitrochlorobenzene having a freezing point of not less than 48.9° C. The existence of at least two distinct grades of 2,4-dinitrochlorobenzene, one of high purity and another, known as a commercial or technical quality, which is relatively impure, may be shown by reference to page 27 of the 24th Edition, January 1940, of "Monsanto Chemicals" which offers for sale:

2,4-Dinitrochlorobenzene
  Special material 48.0° C. minimum crystallizing point
  Standard material 46.5° C. minimum crystallizing point.

We have found that dinitrophenylamines may be prepared by reacting a dinitrochlorobenzene dissolved in an organic water-immiscible solvent with ammonia or a primary or secondary aryl, alkyl, or mixed aryl-alkyl amine and then filtering the dinitrophenylamine product from the slurry directly. The dinitrophenylamines such as dinitromethylaniline, dinitroaniline, dinitrodiphenylamine, dinitrodimethylaniline and the like are relatively insoluble in the slurry and may be filtered directly without the necessity for steam distilling the organic solvent from the reaction mixture. By first filtering the product, we have found that a major portion of the impurities are carried along in the filtrate and no longer contaminate the product. Apparently the major portion of the impurities are soluble in the organic solvent and where this solvent is removed prior to filtration by distillation, the impurities remain behind either dissolved in or absorbed on the crystals of the dinitrophenylamine product. The organic solvent, according to our improved process, may be recovered from the filtrate by steam distillation, and after being distilled is recovered free from the impurities and is suitable for reuse in the process. The organic solvent must be distilled from the impurities before it is suitable for reuse in our process. Otherwise, upon reuse it will no longer serve the double function of acting as a solvent for one of the reactants and as a medium for carrying off the impurities from the final product.

Obviously, in order to carry out our process in the manner which we propose, the product must be relatively insoluble in the reaction mixture. In selecting and proportioning the organic water-immiscible solvent to be used in carrying out the process, this factor must be kept in mind. The dinitrophenylamines are generally relatively insoluble in either the organic solvents or water which is also present as the solvent or diluting agent for the ammonia or primary or secondary amine used and for the sodium chloride formed during the reaction. Our invention may be better understood by references to the following examples:

*Example 1*

To 202.5 parts of dinitrochlorobenzene (freezing point 47.9° C.) is added 175 parts by weight of benzene. This solution is placed in a jacketed vessel provided with an agitator and reflux condenser and the temperature of the solution is brought to 70° C. while constantly agitated. 217.4 parts by weight of a 15% aqueous monomethylamine solution are added to the dinitrochlorobenzene solution over an interval of from 15 to 20 minutes. During this addition the stirred reaction mixture boils and refluxes gently. After addition of the monomethylamine solution has been completed, there is then added over a 10—15 minute interval 129 parts by weight of a 31% sodium hydroxide solution. Throughout this addition the reaction mixture is maintained at approximately 70° C. and is allowed to reflux slowly with constant stirring. After the addition of the sodium hydroxide solution has been completed agitation of the reaction mixture is continued for approximately one hour, during which time the temperature is maintained at 70° C. The contents of the vessel are then cooled to approximately 25° C. and the slurry is filtered. This dinitromethylaniline slurry is then washed, first with approximately 40 parts by weight of benzene, and then with several hundred parts by weight of water or until the wash water gives a negative test for chlorides.

The dinitromethylaniline is then dried to a constant weight at 60° C. The product has a melting point of from 177.5° to 178.0° C. The benzene which is in the filtrate should be steam distilled or otherwise purified before it is used again in the reaction mixture.

*Example 2*

875 parts of 2,4-dinitrochlorobenzene having a freezing point of 47.5° C. dissolved in 550 parts of monochlorobenzene were placed in a jacketed autoclave with 875 parts of 28% aqua ammonia and 235 parts of water. The mixture was heated in the autoclave for one hour at 150° C. The charge was then allowed to cool to 25° C. and the slurry was filtered. The crystals of 2,4-dinitroaniline obtained were washed with 250 parts of monochlorobenzene and then with 1500 parts of water and finally dried to a constant weight. The product obtained was 764 parts of 2,4-dinitroaniline having a melting point of 178.4° C.

Where the reaction was carried out in the absence of the organic solvent, the other conditions being the same as described above except for the monochlorobenzene wash which was also eliminated, 778 parts of 2,4-dinitroaniline were obtained which, however, had a melting point of only 175.6° C.

*Example 3*

202.5 parts of 2,4-dinitrochlorobenzene having a freezing point of 47.95° C. and 175 parts of toluene were placed in a vessel fitted with an agitator and reflux condenser, and the temperature of the mixture brought to 85° C. Over a period of 14 minutes 97.6 parts of aniline were slowly added to the mixture with constant agitation. The reaction mixture was maintained at a temperature of 85° C. for one hour with constant agitation. The 314 parts of a 12.7% aqueous caustic soda solution were added. The heating was further continued with gentle refluxing for one hour. The mixture was then divided and treated as follows: A. 371 parts of the mixture were cooled to 25° C. and the 2,4-dinitrodiphenylamine separated from the slurry by filtration. The press cake was washed with 25 parts of benzene and then with hot water until free from chlorides. The product crystals were then dried to a constant weight. 86.7 parts of 2,4-dinitrodiphenylamine having a melting point of 155.7° C. were obtained as the product from this portion of the reaction mixture. B. The second portion of the reaction mixture also comprising 371 parts was steam distilled to remove the toluene. The aqueous slurry was filtered, washed with hot water until free from chlorides and dried to a constant temperature in the same manner as portion A above. 95.2 parts of 2,4-dinitrodiphenylamine having a melting point of 140° C. were obtained.

*Example 4*

202.5 parts of dinitrochlorobenzene having a freezing point of 47.95° C. and 175 parts of benzene were placed in a jacketed vessel fitted with an agitator and reflux condenser and heated to 74° C. Over a period of 20 minutes 232 parts of a 20.4% aqueous dimethylamine solution were added to the above mixture. After the addition of the dimethylamine solution was completed 129 parts of a 31% aqueous caustic soda solution were then added over a period of 22 minutes. The reaction mixture was refluxed for 15 minutes at 74° C. The reaction mixture was then divided into two portions and treated as follows: A. 362 parts of the mixture were cooled to 25° C. and the 2,4-dinitrodimethylaniline filtered from the slurry. The product was washed with 25 parts of benzene and then with water until free from chlorides. The product, after being dried to a constant weight, showed a yield of 39.5 parts of 2,4-dinitrodimethylaniline having a melting point of 77.5° C. B. The second portion of the slurry also containing 362 parts of the mixture was steam distilled to remove the benzene. The dinitrodimethylaniline was recovered from the aqueous slurry, washed with water until free from chlorides and dried to a constant weight. 97 parts of 2,4-dinitrodimethylaniline having a melting point of 74.5° C. were obtained.

The above examples are by way of illustration only and are not to be construed as limiting the invention. Other inert water-insoluble organic solvents may be used besides those given in the specific examples. We have found that xylene, toluene, benzene, gasoline, monochlorobenzene, carbon tetrachloride, tetrachlorethane and other similar solvents are suitable as the solvent for the dinitrochlorobenzene. Generally, solvents which are inert to ammonia and the primary and secondary alkyl or aryl or mixed amines are suitable for carrying out the invention. In addition to ammonia, monomethylamine, dimethylamine and aniline, other primary or secondary alkyl or aryl or mixed alkyl-aryl amines may be used in the reaction with dinitrochlorobenzene. Higher alkyl primary or secondary amines such as ethylamine, diethylamine, methylethylamine, isopropylamine, ethylisopropylamine, and the like are suitable. Similarly, such compounds as toluidine, xylidine or the mixed alkyl-aryl amines such as methylaniline, ethylaniline, methyl toluidine, ethyl toluidine and the like may be used.

In carrying out the process the subsequent washing of the dinitrophenylamine with the organic solvent is optional, but it does facilitate a more complete removal of the impurities, principally by its action in freeing the dinitrophenylamine of adsorbed solvent containing the dissolved impurities.

The improved result that is obtained by our process is readily apparent by a study of the specific examples. Although the quantity of product is less where the product is filtered directly from the slurry containing the organic solvent, the purity of the product is much higher as is shown by the considerably higher melting points obtained for the product which has been filtered from the solvent.

We claim:

1. A process of preparing a nitrophenylamine which comprises reacting a nitro halogen benzene wherein the nitro and halogen radicals are nuclear substituents with a compound having the formula

where R is a radical included in the group consisting of hydrogen, alkyl and aryl, the reaction taking place in the presence of an inert water-immiscible organic solvent and filtering the slurry produced to separate the nitrophenylamine product from the organic solvent whereby impurities soluble in the solvent are carried into the filtrate and separated from the nitrophenylamine product.

2. A process of preparing dinitrophenylamines of high purity from technical dinitrochlorobenzene which comprises reacting the dinitrochlorobenzene with a compound having the formula

where R is a radical included in the group consisting of hydrogen, alkyl and aryl, the reaction taking place in the presence of an inert water-immiscible organic solvent and filtering the slurry produced to separate the dinitrophenylamine product from the organic solvent whereby impurities soluble in the solvent are carried into the filtrate and separated from the dinitrophenylamine product.

3. A process of preparing dinitromethylaniline of high purity from technical dinitrochlorobenzene which comprises reacting the dinitrochlorobenzene with monomethylamine in the presence of an inert water-immiscible organic solvent, and filtering the slurry produced to separate the dinitromethylaniline from the organic solvent whereby impurities soluble in the solvent are carried into the filtrate and separated from the dinitromethylaniline.

4. A process of preparing dinitroaniline of high purity from technical dinitrochlorobenzene which comprises reacting the dinitrochlorobenzene with ammonia in the presence of an inert water-immiscible organic solvent and filtering the slurry produced to separate the dinitroaniline from the organic solvent whereby impurities soluble in the solvent are carried into the filtrate and separated from the dinitroaniline.

5. A process for the preparation of dinitromethylaniline of high purity from technical dinitrochlorobenzene which comprises reacting the dinitrochlorobenzene with monomethylamine in the presence of benzene, and filtering the slurry produced to separate the dinitromethylaniline from the benzene whereby impurities soluble in the solvent are carried into the filtrate and separated from the dinitromethylaniline.

6. The process for the preparation of dinitrophenylamines of high purity from technical dinitrochlorobenzene which comprises reacting the dinitrochlorobenzene with a compound having the formula

where R is a radical included in the group consisting of hydrogen, alkyl and aryl, the reaction taking place in the presence of an inert water-immiscible organic solvent, neutralizing the hydrochloric acid formed during the reaction and filtering the slurry produced to separate the dinitrophenylamine product from the organic solvent whereby impurities soluble in the solvent are carried into the filtrate and separated from the dinitrophenylamine.

7. A process of preparing dinitrophenylamines of high purity from technical dinitrochlorobenzene which comprises reacting the dinitrochlorobenzene with a compound having the formula

where R is a radical included in the group consisting of hydrogen, alkyl and aryl, the reaction taking place in the presence of an inert water-immiscible organic solvent, filtering the slurry produced to separate the dinitrophenylamine product from the organic solvent whereby the impurities soluble in the solvent are carried into the filtrate and separated from the dinitrophenylamine, and washing the precipitate with additional organic solvent to further complete the removal of the impurities.

8. A process of preparing dinitromethylaniline of high purity from technical dinitrochlorobenzene which comprises reacting the dinitrochlorobenzene with monomethylamine in the presence of an inert-water immiscible organic solvent, filtering the slurry produced to separate the dinitromethylaniline product from the organic solvent whereby impurities soluble in the solvent are carried into the filtrate and separated from the dinitromethylaniline, and washing the precipitate with additional organic solvent to further complete the removal of the impurities.

KENNETH H. KLIPSTEIN.
ALFRED G. HILL.